United States Patent
Kim et al.

(10) Patent No.: US 12,460,033 B2
(45) Date of Patent: Nov. 4, 2025

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Yu Jin Kim, Daejeon (KR); Suk Joon Yoo, Daejeon (KR); Geun Seung Baek, Daejeon (KR); Hyun Jun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 555 days.

(21) Appl. No.: 17/606,848

(22) PCT Filed: Sep. 11, 2020

(86) PCT No.: PCT/KR2020/012323
§ 371 (c)(1),
(2) Date: Oct. 27, 2021

(87) PCT Pub. No.: WO2021/049913
PCT Pub. Date: Mar. 18, 2021

(65) Prior Publication Data
US 2022/0259333 A1  Aug. 18, 2022

(30) Foreign Application Priority Data

Sep. 11, 2019 (KR) .................. 10-2019-0113004
Sep. 10, 2020 (KR) .................. 10-2020-0116402

(51) Int. Cl.
| | | |
|---|---|---|
| C08F 236/06 | (2006.01) |
| B60C 1/00 | (2006.01) |
| C08C 19/22 | (2006.01) |
| C08C 19/25 | (2006.01) |
| C08F 2/06 | (2006.01) |
| C08F 8/32 | (2006.01) |
| C08F 8/42 | (2006.01) |
| C08F 226/06 | (2006.01) |
| C08F 236/10 | (2006.01) |
| C08F 236/14 | (2006.01) |
| C08K 3/36 | (2006.01) |
| C08K 5/544 | (2006.01) |
| C08L 9/06 | (2006.01) |

(52) U.S. Cl.
CPC ............ *C08F 236/06* (2013.01); *C08C 19/22* (2013.01); *C08C 19/25* (2013.01); *C08F 2/06* (2013.01); *C08F 8/32* (2013.01); *C08F 8/42* (2013.01); *C08F 226/06* (2013.01); *C08F 236/10* (2013.01); *C08F 236/14* (2013.01); *C08K 3/36* (2013.01); *C08K 5/544* (2013.01); *C08L 9/06* (2013.01); *B60C 1/0016* (2013.01)

(58) Field of Classification Search
CPC .. C08F 236/06; C08F 2/06; C08F 8/32; C08F 8/42; C08F 226/06; C08F 236/10; C08F 236/14; C08F 8/30; C08F 112/26; C08F 299/00; C08F 236/04; C08F 8/08; C08C 19/22; C08C 19/25; C08C 19/44; C08K 3/36; C08K 5/544; C08K 9/06; C08K 5/3492; C08L 9/06; C08L 15/00; B60C 1/0016; Y02T 10/86
See application file for complete search history.

(56) References Cited

U.S. PATENT DOCUMENTS

| | | | |
|---|---|---|---|
| 4,397,994 A | 8/1983 | Takeuchi et al. | |
| 4,835,216 A | 5/1989 | Morikawa et al. | |
| 5,241,008 A | 8/1993 | Hall | |
| 7,964,674 B2 * | 6/2011 | Sasagawa | C08F 8/04 525/383 |
| 8,071,676 B2 * | 12/2011 | Matsuda | C09J 151/04 525/379 |
| 8,106,130 B2 | 1/2012 | Fukuoka et al. | |
| 8,501,849 B2 | 8/2013 | Cruse et al. | |
| 8,946,339 B2 | 2/2015 | Yoshida et al. | |
| 9,243,090 B2 | 1/2016 | Arriola et al. | |
| 9,315,600 B2 | 4/2016 | Hayata et al. | |
| 9,550,839 B2 | 1/2017 | Kaszas et al. | |

(Continued)

FOREIGN PATENT DOCUMENTS

| | | |
|---|---|---|
| CN | 1411472 A | 4/2003 |
| CN | 1578790 A | 2/2005 |

(Continued)

OTHER PUBLICATIONS

Daiki, JP2014125543-MT (Year: 2014).*
Third Party Observation for European Application No. 20863524.3 issued Sep. 15, 2022. 5 pgs.
"TDS M2520", WeConnectScience, Feb. 15, 2022, LG Chem. 1 pg.
"TDS SOL-5271H", SSBR Technical Data Sheet, Kumho Petrochemical [retrieved from the Notification of the Third Party Observation issued on Sep. 15, 2022 for European Application No. 20863524.3 which is a counterpart of the U.S. Appl. No. 17/420,235]. 1 pg.

(Continued)

*Primary Examiner* — Robert S Jones, Jr.
*Assistant Examiner* — Zhen Liu
(74) *Attorney, Agent, or Firm* — Lerner David LLP

(57) ABSTRACT

A modified conjugated diene-based polymer and a rubber composition including the same are disclosed herein. The modified conjugated diene-based polymer has excellent processability and good tensile strength and viscoelasticity. In some embodiments, a modified conjugated diene-based polymer includes a derived unit from a modifier, the modifier including three or more alkoxy groups bonded to silicon; a non-functional chain forming a silicon-carbon bond at one side of the derived unit from a modifier and including a repeating unit derived from a conjugated diene-based monomer; and a functional chain forming a silicon-carbon bond at the other side of the derived unit from a modifier and including two or more derived units from an N-functional group-containing monomer.

8 Claims, No Drawings

(56) References Cited

U.S. PATENT DOCUMENTS

| | | | |
|---|---|---|---|
| 10,676,542 | B2 | 6/2020 | Dire et al. |
| 2003/0100683 | A1 | 5/2003 | Toyoizumi et al. |
| 2004/0106724 | A1 | 6/2004 | Toratani et al. |
| 2004/0254301 | A1 | 12/2004 | Tsukimawashi et al. |
| 2005/0070672 | A1 | 3/2005 | Ozawa et al. |
| 2008/0033110 | A1 | 2/2008 | Suzuki et al. |
| 2009/0203843 | A1 | 8/2009 | Fukuoka et al. |
| 2009/0292043 | A1 | 11/2009 | Kurazumi et al. |
| 2010/0016499 | A1 | 1/2010 | Oshima |
| 2010/0056711 | A1 | 3/2010 | Fujii et al. |
| 2010/0113683 | A1 | 5/2010 | Matsumoto et al. |
| 2010/0152369 | A1 | 6/2010 | Shibata et al. |
| 2010/0179274 | A1 | 7/2010 | Jinbo et al. |
| 2011/0160388 | A1 | 6/2011 | Tanaka et al. |
| 2011/0178233 | A1 | 7/2011 | Chaboche et al. |
| 2011/0275756 | A1 | 11/2011 | Ito et al. |
| 2012/0108737 | A1 | 5/2012 | Shibata et al. |
| 2012/0220716 | A1 | 8/2012 | Nakatani et al. |
| 2013/0023624 | A1 | 1/2013 | Sekikawa et al. |
| 2013/0079464 | A1 | 3/2013 | Nishioka et al. |
| 2013/0085225 | A1 | 4/2013 | Nishioka et al. |
| 2013/0090422 | A1 | 4/2013 | Hinohara et al. |
| 2013/0158205 | A1 | 6/2013 | Lee et al. |
| 2014/0031471 | A1 | 1/2014 | Rademacher et al. |
| 2014/0088256 | A1 | 3/2014 | Fujii |
| 2014/0114014 | A1 | 4/2014 | Tokimune et al. |
| 2014/0243476 | A1 | 8/2014 | Lee et al. |
| 2014/0256847 | A1 | 9/2014 | Sato et al. |
| 2014/0296376 | A1 | 10/2014 | Sato et al. |
| 2014/0371383 | A1 | 12/2014 | Hayata et al. |
| 2015/0073166 | A1 | 3/2015 | Nakatani et al. |
| 2015/0099823 | A1 | 4/2015 | Imoto et al. |
| 2015/0166738 | A1 | 6/2015 | DeDecker et al. |
| 2015/0252133 | A1 | 9/2015 | Morita et al. |
| 2016/0096909 | A1 | 4/2016 | Sekikawa et al. |
| 2016/0122480 | A1 | 5/2016 | Cho et al. |
| 2016/0347877 | A1 | 12/2016 | Lee et al. |
| 2017/0066850 | A1 | 3/2017 | Lee et al. |
| 2017/0275400 | A1 | 9/2017 | Hirata et al. |
| 2017/0283518 | A1 | 10/2017 | Maejima et al. |
| 2017/0291997 | A1 | 10/2017 | Cho et al. |
| 2018/0016423 | A1 | 1/2018 | Tsukada |
| 2018/0030070 | A1 | 2/2018 | Rossle et al. |
| 2018/0030173 | A1 | 2/2018 | Kang et al. |
| 2018/0037674 | A1* | 2/2018 | Yamada ............... C08F 236/06 |
| 2018/0072821 | A1 | 3/2018 | Janowski et al. |
| 2018/0162959 | A1 | 6/2018 | Choi et al. |
| 2018/0170102 | A1 | 6/2018 | Lee et al. |
| 2018/0223006 | A1 | 8/2018 | Lee et al. |
| 2018/0223088 | A1 | 8/2018 | Sohn et al. |
| 2018/0258194 | A1 | 9/2018 | Sohn et al. |
| 2018/0371113 | A1 | 12/2018 | Lee et al. |
| 2018/0371114 | A1 | 12/2018 | Lee et al. |
| 2019/0002598 | A1 | 1/2019 | Lee et al. |
| 2019/0048115 | A1 | 2/2019 | Lee et al. |
| 2019/0169406 | A1 | 6/2019 | Rossle et al. |
| 2019/0203021 | A1 | 7/2019 | Kyo et al. |
| 2019/0233547 | A1 | 8/2019 | Mun et al. |
| 2019/0256635 | A1 | 8/2019 | Kim et al. |
| 2019/0263956 | A1 | 8/2019 | Kim et al. |
| 2019/0300638 | A1 | 10/2019 | Cho et al. |
| 2020/0024383 | A1 | 1/2020 | Yasumoto et al. |
| 2020/0216578 | A1 | 7/2020 | Aoshima et al. |
| 2020/0223968 | A1 | 7/2020 | Sohn et al. |
| 2020/0354482 | A1 | 11/2020 | Lee et al. |
| 2020/0377636 | A1 | 12/2020 | Rössle et al. |
| 2021/0171689 | A1 | 6/2021 | Lee et al. |
| 2021/0253767 | A1 | 8/2021 | Lee et al. |
| 2021/0301046 | A1 | 9/2021 | Sekikawa et al. |

FOREIGN PATENT DOCUMENTS

| | | |
|---|---|---|
| CN | 1592760 A | 3/2005 |
| CN | 101659730 A | 3/2010 |
| CN | 102083889 A | 6/2011 |
| CN | 103764682 A | 4/2014 |
| CN | 106029708 A | 10/2016 |
| CN | 107614538 A | 1/2018 |
| CN | 108026187 A | 5/2018 |
| CN | 108350118 A | 7/2018 |
| CN | 108699179 A | 10/2018 |
| CN | 109563180 A | 4/2019 |
| CN | 109563186 A | 4/2019 |
| CN | 109863186 A | 6/2019 |
| CN | 109890851 A | 6/2019 |
| CN | 109923136 A | 6/2019 |
| CN | 111201255 A | 5/2020 |
| EA | 20173 B1 | 9/2014 |
| EP | 2597117 A1 | 5/2013 |
| EP | 2772514 A1 | 9/2014 |
| JP | H08337614 A | 12/1996 |
| JP | 3378313 B2 | 2/2003 |
| JP | 2008101127 A | 5/2008 |
| JP | 2010077416 A | 4/2010 |
| JP | 2011080023 A | 4/2011 |
| JP | 2011219701 A | 11/2011 |
| JP | 2011252137 A | 12/2011 |
| JP | 4966652 B2 | 7/2012 |
| JP | 2013108035 A | 6/2013 |
| JP | 2013127064 A | 6/2013 |
| JP | 2013204003 A | 10/2013 |
| JP | 2014055264 A | 3/2014 |
| JP | 2014125543 A * | 7/2014 |
| JP | 2014136758 A | 7/2014 |
| JP | 2014162870 A | 9/2014 |
| JP | 2015007151 A | 1/2015 |
| JP | 2015054910 A | 3/2015 |
| JP | 2015101658 A | 6/2015 |
| JP | 2015120792 A | 7/2015 |
| JP | 2015120803 A | 7/2015 |
| JP | 2016065188 A | 4/2016 |
| JP | 6085077 B2 | 2/2017 |
| JP | 201828047 A | 2/2018 |
| JP | 2018030906 A | 3/2018 |
| JP | 2018035241 A | 3/2018 |
| JP | 2018512385 A | 5/2018 |
| JP | 2018513896 A | 5/2018 |
| JP | 2018119104 A | 8/2018 |
| JP | 2018119106 A | 8/2018 |
| JP | 2018534401 A | 11/2018 |
| JP | 2019501228 A | 1/2019 |
| JP | 2019523805 A | 8/2019 |
| KR | 100237192 B1 | 1/2000 |
| KR | 20080044880 A | 5/2008 |
| KR | 100932356 B1 | 12/2009 |
| KR | 20120083387 A | 7/2012 |
| KR | 20130090811 A | 8/2013 |
| KR | 20130093587 A | 8/2013 |
| KR | 101432412 B1 | 8/2014 |
| KR | 20150060697 A | 6/2015 |
| KR | 20160031712 A | 3/2016 |
| KR | 20160032708 A | 3/2016 |
| KR | 20160042952 A | 4/2016 |
| KR | 20160053521 A | 5/2016 |
| KR | 20160062950 A | 6/2016 |
| KR | 20160067489 A | 6/2016 |
| KR | 20160076248 A | 6/2016 |
| KR | 20160079323 A | 7/2016 |
| KR | 20170000810 A | 1/2017 |
| KR | 20170074677 A | 6/2017 |
| KR | 20170076575 A | 7/2017 |
| KR | 20170076588 A | 7/2017 |
| KR | 20170076596 A | 7/2017 |
| KR | 20170118708 A | 10/2017 |
| KR | 20170121694 A | 11/2017 |
| KR | 20170142492 A | 12/2017 |
| KR | 20180060976 A | 6/2018 |
| KR | 20180064212 A | 6/2018 |
| KR | 20180080639 A | 7/2018 |
| KR | 101926619 B1 | 12/2018 |
| KR | 20190020061 A | 2/2019 |
| KR | 20190030216 A | 3/2019 |
| KR | 20190038287 A | 4/2019 |
| KR | 20190128578 A | 11/2019 |

(56) References Cited

FOREIGN PATENT DOCUMENTS

| | | |
|---|---|---|
| KR | 102101005 B1 | 4/2020 |
| KR | 20200078401 A | 7/2020 |
| RU | 2425845 C2 | 8/2011 |
| RU | 2568475 C2 | 11/2015 |
| RU | 2574246 C2 | 2/2016 |
| RU | 2597080 C2 | 9/2016 |
| RU | 2603370 C2 | 11/2016 |
| RU | 2605250 C9 | 4/2017 |
| RU | 2649008 C2 | 3/2018 |
| RU | 2671351 C2 | 10/2018 |
| RU | 2670897 C9 | 12/2018 |
| RU | 2675525 C1 | 12/2018 |
| SG | 10201800555 T | 8/2018 |
| TW | 200829613 A | 7/2008 |
| WO | 2003029299 A1 | 4/2003 |
| WO | 2008123163 A1 | 10/2008 |
| WO | 2008123164 A1 | 10/2008 |
| WO | 2013031599 A1 | 3/2013 |
| WO | 2017216344 A1 | 12/2017 |
| WO | 2018025998 A1 | 2/2018 |
| WO | 2018034194 A1 | 2/2018 |
| WO | 2018034217 A1 | 2/2018 |
| WO | 2018128290 A1 | 7/2018 |
| WO | 2019020752 A1 | 1/2019 |

OTHER PUBLICATIONS

"Solflex 30H41", Technical Data Sheet, Goodyear Tire & Rubber Company [retrieved from the Notification of the Third Party Observation issued on Sep. 15, 2022 for European Application No. 20863524.3 which is a counterpart of the U.S. Appl. No. 17/420,235]. 1 pg.

"TDS 2550", WeConnectScience, Feb. 15, 2022, LG Chem. 1 pg.

"TDS 2550H", WeConnectScience, Feb. 15, 2022, LG Chem. 1 pg.

"TDS F3438" WeConnectScience, Feb. 15, 2022, LG Chem. 1 pg.

"TDS F3626E", WeConnectScience, Feb. 15, 2022, LG Chem. 1 pg.

Dockendorff, J. et al., "Synthesis of Arborescent Polystyrene-g-[poly(2-vinylpyridine)-b-polystyrene] Core-Shell-Corona Copolymers," Journal of PolymerScience Part A: Polymer Chemistry, Feb. 2014, vol. 52, No. 8, pp. 1075-1085.

International Search Report for Application No. PCT/KR2020/012316, dated Dec. 16, 2020, 3 pages.

International Search Report for Application No. PCT/KR2020/012319, dated Dec. 16, 2020, 3 pages.

International Search Report for Application No. PCT/KR2020/012323, mailed Dec. 16, 2020, pp. 1-3.

International Search Report for Application No. PCT/KR2020/012326, mailed Dec. 21, 2020, pp. 1-3.

International Search Report for Application No. PCT/KR2020/012312 mailed Dec. 16, 2020, pp. 1-2.

International Search Report for Application No. PCT/KR2020/012333 mailed Dec. 11, 2020, pp. 1-2.

International Search Report for PCT/KR2020/012329 mailed Dec. 21, 2020; 2 pages.

Schroot, R. et al., "Accumulative Charging of Redox-Active Side-Chain-Modified Polymers: Experimental and Computational Insights from Oligo- to Polymeric Triarylamines", Macromolecules, Jun. 2019, pp. 4673-4685, vol. 52, American Chemical Society.

Sun C. et al., "Improvement of Silica Dispersion in Solution Polymerized Styrene-Butadiene Rubber via Introducing Amino Functional Groups" Industrial & Engineering Chemistry Research, Dec. 2018, pp. 1454-1461, vol. 58, American Chemical Society.

Kozlov, N.A. et al., "Physics of Polymers", Textbook/ Vladimir State University, Vladimir, 2001], p. 345 (p. 230, 234-242, 244-246, 253) [Partial Translation Attached].

Sutyagin, V.M et al., "Chemistry and Physics of Polymers," Textbook, Tomsk, TPU Publishing House, 2003], p. 208, (p. 132, 140-142, 150-151 and 173) [Partial Translation Attached].

Search Report dated Dec. 6, 2022 and Written Opinion dated Dec. 20, 2022 for Singapore Application No. 11202110158P , 10 pages.

Extended European Search Report for Application No. 20862533.5 dated Jun. 3, 2022, pp. 1-5.

Extended European Search Report for Application No. 20863407.1 dated Jul. 11, 2022, pp. 1-5.

Extended European Search Report including Written Opinion for Application No. 20863524.3 dated Feb. 10, 2022, pp. 1-6.

Extended European Search Report including Written Opinion for Application No. 20864068.0 dated Feb. 25, 2022, pp. 1-8.

Wikipedia titled Anionic addition polymerization, access date Dec. 23, 2024, 3 pages.

Wikipedia titled Copolymer, access date Dec. 23, 2024, 5 pages.

Yamada, C. et al., "Influence of functionalized S-SBR on silica-filled rubber compound properties", University of Twente, AsahiKASEI, Jul. 2018, 11 pages.

* cited by examiner

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2020/012323, filed on Sep. 11, 2020, which claims priority from Korean Patent Application No. 10-2019-0113004, filed on Sep. 11, 2019, and Korean Patent Application No. 10-2020-0116402, filed on Sep. 10, 2020, the entire contents of which are incorporated by reference herein.

TECHNICAL FIELD

The present invention relates to a modified conjugated diene-based polymer which has excellent processability and good tensile strength and viscoelasticity properties, and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed to introduce a functional group at the terminal using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

Meanwhile, as the modifier for introducing the functional group to the chain terminal of a polymer, technique of applying an aminoalkoxysilane-based modifier including an alkoxysilane group and an amine group in a molecule at the same time for maximizing the dispersibility and reactivity of a filler is widely known. However, if the number of the amine groups in the modifier increases, there are problems in that the solubility in a hydrocarbon solvent used for preparing a polymer may decrease, and easy modification reaction may become difficult.

PRIOR ART DOCUMENT

Patent Document (Patent Document 1) U.S. Pat. No. 4,397,994 A

DISCLOSURE OF THE INVENTION

Technical Problem

The present invention has been devised to solve the above-mentioned problems of the conventional technique, and an object is to provide a modified conjugated diene-based polymer having excellent affinity with a filler and at the same time, having excellent processability and abrasion resistance through the positioning of a non-functional chain, a derived unit from a modifier, and a N-functional group-rich functional chain.

Also, the present invention provides a rubber composition including the modified conjugated diene-based polymer.

Technical Solution

To solve the above-described tasks, according to an embodiment of the present invention, the present invention provides a modified conjugated diene-based polymer including a derived unit from a modifier including three or more alkoxy groups bonded to silicon; a non-functional chain forming a silicon-carbon bond at one side of the derived unit from a modifier and including a repeating unit derived from a conjugated diene-based monomer; and a functional chain forming a silicon-carbon bond at the other side of the derived unit from a modifier and including two or more derived units from a N-functional group-containing monomer.

Also, the present invention provides a rubber composition including the modified conjugated diene-based polymer and a filler.

Advantageous Effects

The modified conjugated diene-based polymer according to the present invention introduces a functional chain to plentifully distribute functional groups making interaction with a filler and appropriately disposes the functional chain, a derived unit from a modifier, and a non-functional chain, thereby showing excellent affinity with a filler and excellent mechanical properties.

Also, the rubber composition according to the present invention includes the modified conjugated diene-based polymer and may show excellent effects of processability as well as tensile properties and viscoelasticity properties, while improving abrasion resistance.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries, and the words or terms should be interpreted as having a meaning that is consistent with their meaning of the technical idea of the invention, based on the principle that an inventor may properly define the meaning of the words or terms to best explain the invention.

Definition of Terms

The term "polymer" used in the present disclosure refers to a polymer compound prepared by polymerizing monomers of the same or different type. Thus, the common term, polymer refers to a polymer prepared from only one type of a monomer, but includes a commonly used term of homopolymer and copolymer.

The term "functionality" used in the present disclosure may mean inclusion of a functional group and having properties capable of reacting with other functional group or active part, and may mean properties by the inclusion of a functional group including N, O, S or Si in addition to a bond between carbon, or carbon and hydrogen.

The term "non-functional chain" used in the present disclosure may mean the molecular chain of a main skeleton forming a polymer, and may mean a chain mainly including the repeating unit of a conjugated diene-based monomer or a conjugated diene-based monomer and an aromatic vinyl-based monomer.

The term "vinyl content" used in the present disclosure refers to the mass (or weight) percent of butadiene included in 1 and 2 positions in a polymer chain on the basis of a conjugated diene monomer (butadiene, etc.) moiety in the polymer (on the basis of the total weight of polymerized butadiene).

The term "monovalent hydrocarbon group" used in the present disclosure may mean a monovalent atomic group obtained by bonding carbon and hydrogen, in a monovalent alkyl group, alkenyl group, alkynyl group, cycloalkyl group, cycloalkyl group including one or more unsaturated bonds, and aryl group. The minimum carbon number of a substituent represented by the monovalent hydrocarbon may be determined according to the type of each substituent.

The term "divalent hydrocarbon group" used in the present disclosure may mean a divalent atomic group obtained by bonding carbon and hydrogen, in a divalent alkylene group, alkenylene group, alkynylene group, cycloalkylene group, cycloalkylene group including one or more unsaturated bonds and arylene group. The minimum carbon number of a substituent represented by the divalent hydrocarbon may be determined according to the type of each substituent.

The term "alkyl group" used in the present disclosure may mean monovalent aliphatic saturated hydrocarbon, and may include a linear alkyl group such as methyl, ethyl, propyl and butyl; and a branched alkyl group such as isopropyl, sec-butyl, tert-butyl and neo-pentyl.

The term "alkenyl group" used in the present disclosure may mean a monovalent aliphatic unsaturated hydrocarbon including one or two or more double bonds.

The term "alkynyl group" used in the present disclosure may mean a monovalent aliphatic unsaturated hydrocarbon including one or two or more triple bonds.

The term "alkylene group" used in the present disclosure may mean divalent aliphatic saturated hydrocarbon such as methylene, ethylene, propylene and butylene.

The term "aryl group" used in the present disclosure may mean aromatic hydrocarbon, and may include both monocyclic aromatic hydrocarbon in which one ring is formed, and polycyclic aromatic hydrocarbon in which two or more rings are bonded.

The term "heterocyclic group" used in the present disclosure is a cycloalkyl group or aryl group in which carbon atoms are substituted with one or more heteroatoms, for example, may include both a heterocycloalkyl group and a heteroaryl group.

The term "substituted" used in the present disclosure may mean that the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "single bond" used in the present disclosure may mean a single covalent bond itself excluding a separate atomic or molecular group.

The term "derived unit", "derived repeating unit" and "derived functional group" used in the present disclosure may represent a component or a structure comes from a certain material, or the material itself.

It will be further understood that the terms "comprising", "including", and "having" and the derivatives thereof in the present disclosure, though these terms are particularly disclosed or not, do not preclude the presence or addition of optional components, steps, or processes. In order to avoid any uncertainty, all components claimed by using the term "comprising" may include additional additives, auxiliaries, or compounds, including a polymer or other materials, unless described to the contrary. In contrast, the term "consisting essentially of ~" excludes unnecessary ones for operation and precludes optional other components, steps or processes from the scope of optional explanation. The term "consisting of ~" precludes optional components, steps or processes, which are not particularly described or illustrated.

Measurement Methods and Conditions

In the present disclosure, the "vinyl content" is measured and analyzed using Varian VNMRS 500 MHz NMR, and the 1,2-vinyl bond content in a total polymer is calculated and measured by using 1,1,2,2-tetrachloroethane as a solvent during measuring NMR, and calculating 6.0 ppm as a solvent peak, 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

In the present disclosure, "weight average molecular weight (Mw)", "number average molecular weight (Mn)", and "molecular weight distribution (MWD)" are measured through gel permeation chromatography (GPC) analysis and are measured by checking a molecular weight distribution curve. The molecular weight distribution (PDI, MWD, Mw/Mn) is calculated from each molecular weight measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, the "N content" may be measured, for example, through an NSX analysis method, and measurement by the NSX analysis method may use a quantitative analyzer of a trace amount of nitrogen (NSX-2100H). For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for 02, and 300 ml/min for ozonizer, a heater is set to 800° C., and the analyzer is stood for about 3 hours for stabilization. After stabilizing the analyzer, a calibration curve of calibration curve ranges of 5 ppm, 10 ppm, 50 ppm, 100 ppm and 500 ppm is made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

In the present disclosure, the "Si content" is measured using an inductively coupled plasma optical emission spectroscopy (ICP-OES; Optima 7300DV) as an ICP analysis method. Particularly, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:
1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr),
adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

Modified Conjugated Diene-Based Polymer

The present invention provides a modified conjugated diene-based polymer having excellent affinity with a filler, and as a result, capable of providing a rubber composition having excellent processability, tensile properties and viscoelasticity properties.

The modified conjugated diene-based polymer according to an embodiment of the present invention includes a derived unit from a modifier including three or more alkoxy groups bonded to silicon; a non-functional chain forming a silicon-carbon bond at one side of the derived unit from a modifier and including a repeating unit derived from a conjugated diene-based monomer; and a functional chain forming a silicon-carbon bond at the other side of the derived unit from a modifier and including two or more derived units from an N-functional group-containing monomer.

The modified conjugated diene-based polymer has the amount of N atoms in a polymer according to NSX analysis of 100 ppm or more, preferably, 150 ppm or more, more preferably, 170 ppm or more based on a weight. The modified conjugated diene-based polymer introduces a functional chain in which N-functional groups are repeatedly present such that the N atoms may be in the relatively high content, and has a structure in which the N-functional group is bonded to a polymer main chain and a derived unit from an alkoxysilane-based compound bonded to at least one terminal of the main chain. Accordingly, during a compounding process, affinity with a filler, for example, silica and dispersibility may be markedly improved, and viscoelasticity properties may become excellent and at the same time, processability may be largely improved. Meanwhile, for the N content, if an amine-containing alkoxysilane-based modifier is applied, N atoms derived from the modifier may also be present.

According to an embodiment of the present invention, the modified conjugated diene-based polymer may have the amount of Si atoms in a polymer according to ICP analysis of 180 ppm or more, preferably, 190 ppm or more, more preferably, 200 ppm or more based on a weight.

The Si content may be mainly occupied with Si atoms derived from the modifier which is an alkoxysilane-based compound and may be derived from Si additionally included in the N-functional group-containing monomer in addition to the Si derived from the modifier. The Si content allows the expectation of the increase of the functional groups present in the modified conjugated diene-based polymer, i.e., the improvement of affinity with a filler, and may become an important factor as well as the improvement of processability.

In addition, due to such high content of N atoms, the modified conjugated diene-based polymer according to an embodiment of the present invention may satisfy the conditions of the molar ratio (N/Si) of N atoms and Si atoms of 0.75 or more. Generally, a polymer modified by a modifier may include Si atoms and N atoms due to a modification polymerization initiator, a modified monomer, etc., but as described above, since the polymer according to an embodiment of the present invention includes the N-functional group-containing monomer as a repeating unit, the N content may be relatively large, and as consequent symbolic meaning, the molar ratio of the N atoms and the Si atoms may be 0.75 or more, preferably, 0.77 or more, or 0.78 or more, more preferably, 0.8 or more, most optically, 0.9 or more. Through this, the processability improving effects according to the improvement of dispersibility during compounding may be optimized.

Structure of Modified Conjugated Diene-Based Polymer

According to an embodiment of the present invention, the modified conjugated diene-based polymer includes a non-functional chain and a functional chain, and the non-functional chain and the functional chain have an inter-combined structure via the derived unit from a modifier. The non-functional chain and the functional chain are bonded (or coupled) with the derived unit from a modifier as a center, wherein the non-functional chain and the functional chain may be each independently coupled by one or more chains, and preferably, the functional chain may be coupled by two or more chains.

The coupling of the functional chain and the non-functional chain with the derived unit from a modifier as a center may be achieved by the reaction between the living anionic terminal of each chain and the Si bond alkoxy group of the modifier. That is, the above-described structure may be achieved through modification reaction and pseudo-modification reaction after polymerization.

With the above-described structure, all functional groups may be distributed in one terminal of a polymer, and if making interaction with silica, only one terminal of the polymer may be coupled with the silica, and the other terminal may be in a free state. Accordingly, similar to the conventional single terminal-modified polymer, dispersibility and flocculation prevention of a filler may be excellent, and processability may be excellent.

In addition, in the conventional both terminal-modified polymer, functional group-containing monomers are generally coupled with the other terminal different from the derived unit from a modifier, and if such a structure is employed, functional groups may be plentiful, affinity with a filler may be improved, and viscoelasticity properties may be improved, but the degree of freedom of a polymer structure may be largely deteriorated, and processability may be very poor. However, the modified conjugated diene-based polymer according to the present invention has a structure in which the functional chain is adjacent to the derived unit from a modifier, and equal or better degree of interaction with a filler may be achieved, and accordingly, excellent improving effects of viscoelasticity properties may be achieved, and marked improvement of processability may be achieved.

In addition, synergistic effects in the interaction with a filler may be generated and abrasion resistance may be largely improved by the presence of the functional chain at the same terminal as the derived unit from a modifier.

That is, according to an embodiment of the present invention, the functional chain including the repeating unit derived from an N-functional group-containing monomer and the derived unit from a modifier are concentrated at one side in an entire polymer, advantages of the conventional single terminal-modified conjugated diene-based polymer, both terminal-modified conjugated diene-based polymer and enchain-modified conjugated diene-based polymer may be achieved, while solving defects.

Non-Functional Chain Including Repeating Unit Derived from Conjugated Diene-Based Monomer According to an embodiment of the present invention, the non-functional chain which is the main skeleton of the modified conjugated diene-based polymer includes a repeating unit derived from a conjugated diene-based monomer as a main unit, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

In addition, the non-functional chain may include an aromatic vinyl-based monomer and may further include a repeating unit derived therefrom in addition to the conjugated diene-based monomer, and the aromatic vinyl-based monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl)-α-methylstyrene.

In another embodiment, the non-functional chain of the modified conjugated diene-based polymer may be a copolymer further including a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, if two or more monomers are included in the non-functional chain which forms the skeleton of the modified conjugated diene-based polymer, the polymer may be a random copolymer chain, and in this case, effects of excellent balance between physical properties may be achieved. The random copolymer may mean the arrangement of repeating units forming a copolymer in disorder.

In the non-functional chain of the modified conjugated diene-based polymer according to an embodiment of the present invention, a functional group may not be included, and here, the functional group may be an N-containing functional group, an S-containing functional group, an O-containing functional group, or an Si-containing functional group. By not distributing functional groups in one non-functional chain, effects by disposing the functional chain adjacent to the derived unit from a modifier as described above may be achieved.

Functional Chain Including Repeating Unit Derived from N-Functional Group-Containing Monomer According to an embodiment of the present invention, the functional chain of the modified conjugated diene-based polymer includes a repeating unit derived from an N-functional group-containing monomer.

According to an embodiment of the present invention, the main unit composing the functional chain is the N-function group-containing monomer. The N-functional group may be basically an amino group, an aliphatic cyclic amino group, an aliphatic chain type amino group, an aromatic amino group, etc.

In addition, one unit of the functional chain may be coupled with the derived unit from a modifier, and two or more units of the functional chain may be coupled through two or more alkoxysilyl groups present in an alkoxysilyl-based modifier.

The functional chain may be a repeatedly bonded type of the N-functional group-containing monomer, and the number of the repeating unit may be 2 to 80. With the number of the repeating units of 2 to 80, the functional groups with a degree desired to obtain by disposing the functional chain on a structure may be secured, and both processability and compounding properties may be achieved.

The functional chain may further include a derived unit from a conjugated diene-based monomer. That is, the functional chain may be polymerized (low-polymerized) only with the N-functional-group-containing monomer, but may be prepared by polymerizing (low-polymerizing) the N-functional group-containing monomer and a conjugated diene-based monomer together. In this case, the functional chain may have a random copolymer type in which the conjugated diene-based monomer and the N-functional group-containing monomer are optionally arranged, or a block copolymer type in which the same units are gathered and arranged, and the type is not limited.

The weight average molecular weight of the functional chain may be smaller than the weight average molecular weight of the non-functional chain, for example, may be 50% or less, 30% or less, preferably, 20% or less, more preferably, 5% or less of the weight average molecular weight of the non-functional chain. This may be a degree such that the non-functional chain may be coupled with the residual alkoxy group present in the modifier, and a difference which may overcome the steric hindrance of the non-functional chain modified by or coupled with a modifier may be sufficient, but is not absolutely a standard on the degree of the molecular weight difference.

Meanwhile, conventionally, as a method of additionally introducing a functional group to a polymer, a method by which an active polymer is modified by a modifier and then, condensation reaction of reacting a compound which may be condensed with the Si—O bond of the modifier is performed, has been applied. However, if using such condensation reaction, the bond between a material having an additional functional group and a modified polymer may be formed into —Si—O—Si—, and then, there may arise hydrolysis during a step of steam stripping or washing, or storing, and defects of separating a bond at a condensation bond part may arise, and at last, the functional group may lost.

On the contrary, in case of the modified conjugated diene-based polymer according to the present invention, the living terminal of the functional chain reacts with the Si—O—R group of the modifier to form a Si—C bond, and there is no fear of separation in that this bond is a bond not undergoing hydrolysis reaction like a condensed bond, and accordingly, storage stability may be improved, and there are not defects of losing initially introduced functional group.

According to an embodiment of the present invention, the N-functional group-containing monomer may be, for example, a compound represented by Formula 1 below.

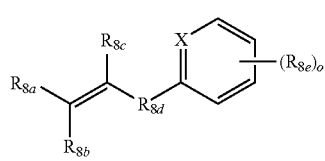

[Formula 1]

In Formula 1,
X is N or CH,
$R_{8a}$ to $R_{8c}$ are each independently a hydrogen atom; an alkyl group of 1 to 20 carbon atoms; an alkenyl group of 2 to 20 carbon atoms; an alkynyl group of 2 to 20 carbon atoms; a heteroalkyl group of 1 to 20 carbon atoms, a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms, $R_{8d}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, $R_{8e}$ is an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a functional group represented by Formula 1a below, and O is an integer of 0 to 5, at least one $R_{8e}$ is a functional group represented by Formula 1a below, and if o is an integer of 2 to 5, multiple $R_{8e}$ groups may be the same or different,

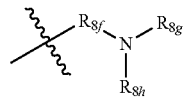

[Formula 1a]

in Formula 1a,
$R_{8f}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and $R_{8g}$ and $R_{8h}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms or a mono-substituted, di-substituted or tri-substituted alkylsilyl group with alkyl groups of 1 to 10 carbon atoms, or $R_{8g}$ and $R_{8h}$ are connected with each other to form a heterocyclic group of 2 to 10 carbon atoms together with N.

In addition, the N-functional group-containing monomer may be a compound represented by Formula 2 below.

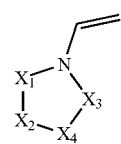

[Formula 2]

In Formula 2, $X_1$-$X_2$ is $CH_2$—$CH_2$ or CH=CH, and $X_3$-$X_4$ is $CH_2$—$CH_2$, CH=N or N=N.

In addition, the N-functional group-containing monomer may be a compound represented by Formula 3 below.

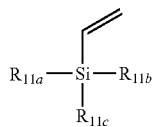

[Formula 3]

In Formula 3, $R_{11a}$ and $R_{11b}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a functional group represented by Formula 3a below, $R_{11c}$ is an alkyl group of 1 to 20 carbon atoms; an alkenyl group of 2 to 20 carbon atoms; an alkynyl group of 2 to 20 carbon atoms; a heteroalkyl group of 1 to 20 carbon atoms, a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a functional group represented by Formula 3a below, and at least one of $R_{11a}$, $R_{11b}$ and $R_{11c}$ is a functional group represented by Formula 3a below.

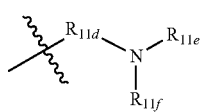

[Formula 3a]

In Formula 3a, $R_{11d}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and $R_{11e}$ and $R_{11f}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

In addition, the N-functional group-containing monomer may be a compound represented by Formula 4 below.

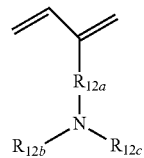

[Formula 4]

In Formula 4, $R_{12a}$ is a single bond or a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and $R_{12b}$ and $R_{12c}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

Modifier: Alkoxysilane-Based Compound

In addition, the modified conjugated diene-based polymer may have a coupled type of the non-functional chain and the functional chain by the alkoxysilane-based modifier, and the non-functional chain and the functional chain may be coupled using the alkoxysilane-based modifier as a hub. Here, the alkoxysilane-based modifier may include at least three alkoxy groups bonded to Si.

According to an embodiment of the present invention, the alkoxysilane-based modifier included in the modified conjugated diene-based polymer may be an amine-containing alkoxysilane-based compound or a non-amine-containing alkoxysilane-based compound.

In addition, among the alkoxysilane-based modifier, the amine-containing alkoxysilane-based compound may be, for example, a compound represented by Formula 5 below.

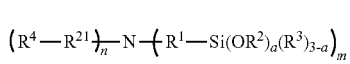

[Formula 5]

In Formula 5, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an epoxy group, an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, or a heterocyclic group of 2 to 10 carbon atoms, $R^{21}$ may be a single bond, an alkylene group of 1 to 10 carbon atoms, or —[$R^{42}$O]$_j$—, where $R^{42}$ may be an alkylene group of 1 to 10 carbon atoms, a and m may be each independently an integer selected from 1 to 3, n may be an integer of 0 to 2, and j may be an integer selected from 1 to 30.

In a particular embodiment, the compound represented by Formula 5 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, tri(trimethoxysilyl)amine, tri-(3-(trimethoxysilyl)propyl)amine, N,N-bis(3-(diethoxy(methyl)silyl)propyl)-1,1,1-trimethylsilanamine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimethoxysilyl)propyl)-1H-1,2,4-triazol-3-yl)propyl)propan-1-amine, N-allyl-N-(3-(trimethoxysilyl)propyl)prop-2-en-1-amine, N,N-bis(oxiran-2-ylmethyl)-3-(trimethoxysilyl)propan-1-amine, 1,1,1-trimethyl-N-(3-(triethoxysilyl)propyl)-N-(trimethylsilyl)silanamine) and N,N-bis(3-(triethoxysilyl)propyl)-2,5,8,11,14-pentaoxa-hexadecan-16-amine.

In another embodiment, among the alkoxysilane-based modifier, the amine-containing alkoxysilane-based compound may include a compound represented by Formula 6 below.

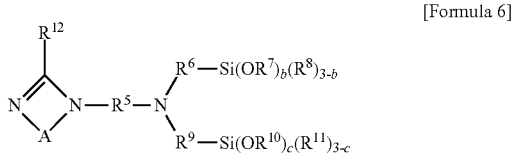

[Formula 6]

In Formula 6, $R^5$, $R^6$ and $R^9$ may be each independently an alkylene group of 1 to 10 carbon atoms, $R^7$, $R^8$, $R^{10}$ and $R^{11}$ may be each independently an alkyl group of 1 to 10 carbon atoms, $R^{12}$ may be hydrogen or an alkyl group of 1 to 10 carbon atoms, b and c may be each independently 1, 2 or 3, where b+c≥4 may be satisfied, and A may be

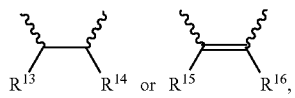

where $R^{13}$, $R^{14}$, $R^{15}$ and $R^{16}$ may be each independently hydrogen or an alkyl group of 1 to 10 carbon atoms.

In a particular embodiment, the compound represented by Formula 6 may be one selected from the group consisting of N-(3-(1H-imidazol-1-yl)propyl)-3-(triethoxysilyl)-N-(3-(triethoxysilyl)propyl)propan-1-amine and 3-(4,5-dihydro-1H-imidazol-1-yl)-N,N-bis(3-(triethoxysilyl)propyl)propan-1-amine.

In another embodiment, among the alkoxysilane-based modifier, the amine-containing alkoxysilane-based compound may include a compound represented by Formula 7 below.

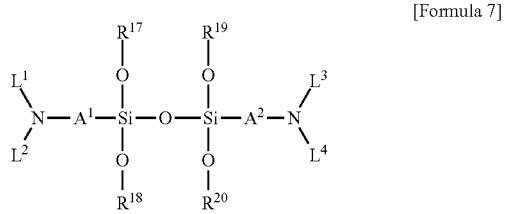

[Formula 7]

In Formula 7, $A^1$ and $A^2$ may be each independently a divalent hydrocarbon group of 1 to 20 carbon atoms, which contains an oxygen atom or not, $R^{17}$ to $R^{20}$ may be each independently a monovalent hydrocarbon group of 1 to 20 carbon atoms, $L^1$ to $L^4$ may be each independently a mono-substituted, di-substituted or tri-substituted alkylsilyl group with alkyl groups of 1 to 10 carbon atoms, or a monovalent hydrocarbon group of 1 to 20 carbon atoms, wherein $L^1$ and $L^2$, and $L^3$ and $L^4$ may be combined with each other to form rings of 1 to 5 carbon atoms, and if $L^1$ and $L^2$, and $L^3$ and $L^4$ are combined with each other to form rings, the rings thus formed may include one or more heteroatoms selected from the group consisting of N, O and S.

In a particular embodiment, the compound represented by Formula 7 may be one selected from the group consisting of 3,3'-(1,1,3,3-tetramethoxydisiloxane-1,3-diyl)bis(N,N-dimethylpropan-1-amine, 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dimpropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine, N,N'-((1,1,3,3-tetraethoxydisiloxane-1,3-diyl)bis(propan-3,1-diyl))bis(1,1,1-trimethyl-N-(trimethylsilyl)silanamine, N,N'-((1,1,3,3-tetrapropoxydisiloxane-1,3-diyl)bis(propan-3,1-diyl))bis(1,1,1-trimethyl-N-(trimethylsilyl)silanamine, N,N'-((1,1,3,3-tetramethoxydisiloxane-1,3-diyl)bis(propan-3,1-diyl))bis(1,1,1-trimethyl-N-phenylsilanamine, N,N'-((1,1,3,3-tetraethoxydisiloxane-1,3-diyl)bis(propan-3,1-diyl))bis(1,1,1-trimethyl-N-phenylsilanamine, N,N'-((1,1,3,3-tetrapropoxydisiloxane-1,3-diyl)bis(propan-3,1-diyl))bis(1,1,1-trimethyl-N-phenylsilanamine, 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

In another embodiment, among the alkoxysilane-based compound, the amine-containing alkoxysilane-based compound may include a compound represented by Formula 8 below.

[Formula 8]

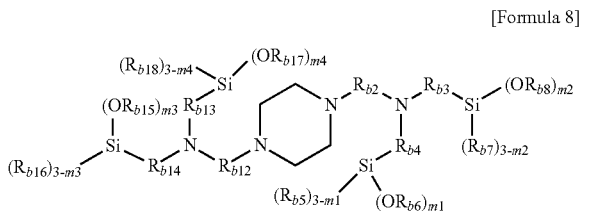

In Formula 8, $R_{b2}$ to $R_{b4}$ are each independently an alkylene group of 1 to 10 carbon atoms, $R_{b5}$ to $R_{b8}$ are each independently an alkyl group of 1 to 10 carbon atoms, $R_{b13}$ and $R_{b14}$ are each independently an alkylene group of 1 to 10 carbon atoms, $R_{b15}$ to $R_{b18}$ are each independently an alkyl group of 1 to 10 carbon atoms, and m1, m2, m3 and m4 are each independently an integer of 1 to 3.

In another embodiment, among the alkoxysilane-based compound, the amine-containing alkoxysilane-based compound may include a compound represented by Formula 9 below.

[Formula 9]

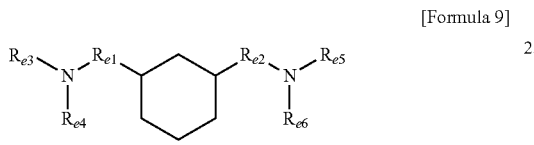

In Formula 9, $R_{e1}$ and $R_{e2}$ are each independently an alkylene group of 1 to 10 carbon atoms, $R_{e3}$ to $R_{e6}$ are each independently hydrogen, an alkyl group of 1 to 10 carbon atoms or $-R_{e7}SiR_{e8}R_{e9}R_{e10}$, where at least one among $R_{e3}$ to $R_{e6}$ is $-R_{e7}SiR_{e8}R_{e9}R_{e10}$, wherein $R_{e7}$ is a single bond or an alkylene group of 1 to 10 carbon atoms, $R_{e8}$ to $R_{e10}$ are each independently an alkyl group of 1 to 10 carbon atoms or an alkoxy group of 1 to 10 carbon atoms, where at least one among $R_{e8}$ to $R_{e10}$ is an alkoxy group of 1 to 10 carbon atoms.

In another embodiment, among the alkoxysilane-based compound, the non-amine-containing alkoxysilane-based compound may include a compound represented by Formula 10 below.

[Formula 10]

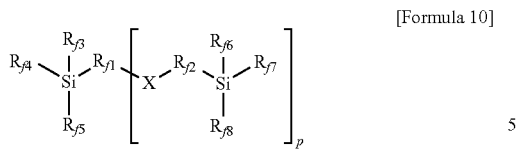

In Formula 10, X is O or S, $R_{f1}$ and $R_{f2}$ are each independently a single bond or an alkylene group of 1 to 10 carbon atoms, $R_{f3}$ to $R_{f8}$ are each independently hydrogen, an alkyl group of 1 to 10 carbon atoms, an alkoxy group of 1 to 10 carbon atoms, an aryl group of 6 to 10 carbon atoms, a cycloalkyl group of 5 to 10 carbon atoms or an aralkyl group of 7 to 14 carbon atoms, and p is an integer of 0 or 1, where if p is 0, $R_{f1}$ is an alkyl group of 1 to 10 carbon atoms or an alkoxy group of 1 to 10 carbon atoms.

In another embodiment, among the alkoxysilane-based compound, the non-amine-containing alkoxysilane-based compound may include a compound represented by Formula 11 below.

[Formula 11]

In Formula 11, $R_{g1}$ to $R_{g4}$ are each independently hydrogen, an alkyl group of 1 to 10 carbon atoms, an alkoxy group of 1 to 10 carbon atoms, an aryl group of 6 to 12 carbon atoms or $-R_{g5}SiOR_{g6}$), where at least one among $R_{g1}$ to $R_{g4}$ is $-R_{g5}SiOR_{g6}$, wherein $R_{g5}$ is a single bond or an alkylene group of 1 to 10 carbon atoms, $R_{g6}$ is an alkyl group of 1 to 10 carbon atoms, and Y is C or N, where if Y is N, $R_{g4}$ is not present.

In another embodiment, among the alkoxysilane-based compound, the amine-containing alkoxysilane-based compound may include a compound represented by Formula 12 below.

[Formula 12]

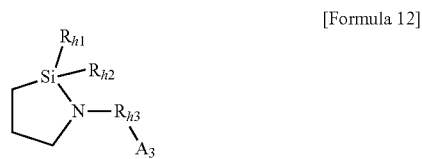

In Formula 12, $R_{h1}$ and $R_{h2}$ are each independently an alkyl group of 1 to 10 carbon atoms or an alkoxy group of 1 to 10 carbon atoms, $R_{h3}$ is a single bond or an alkylene group of 1 to 10 carbon atoms, and $A_3$ is $-Si(R_{h4}R_{h5}R_{h6})$ or $N[Si(R_{h7}R_{h8}R_{h9})]_2$, where $R_{h4}$ to $R_{h9}$ are each independently an alkyl group of 1 to 10 carbon atoms or an alkoxy group of 1 to 10 carbon atoms.

In another embodiment, among the alkoxysilane-based compound, the non-amine-containing alkoxysilane-based compound may be a compound represented by Formula 13 below.

[Formula 13]

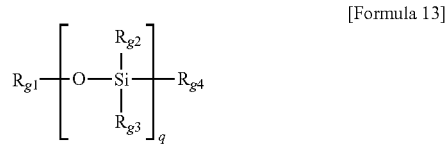

In Formula 13, $R_{g1}$ to $R_{g3}$ are each independently an alkyl group of 1 to 10 carbon atoms or an alkoxy group of 1 to 10 carbon atoms, $R_{g4}$ is an alkoxy group of 1 to 10 carbon atoms, and q is an integer of 2 to 100.

General Details

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and a peak average molecular weight (Mp) of 1,000 g/mol to 3,000,000 g/mol, 10,000 g/mol to 2,000,000 g/mol, or 100,000 g/mol to 2,000,000 g/mol. Within the ranges, excellent effects of rolling resistance and wet skid resistance may be achieved. In another embodiment, the modified conjugated diene-based polymer may have molecular weight distribution (PDI; MWD; Mw/Mn) of 1.0 to 3.0, or 1.1 to 2.5, or 1.1 to 2.0, and within this range, excellent effects of tensile properties, viscoelasticity properties, and balance between physical properties may be achieved, Also, the modified conjugated diene-based polymer may have a mooney viscosity at 100° C. of 30 or more, 40 to 150, or 40 to 140, and within this range, excellent effects of processability and productivity may be achieved.

Here, the mooney viscosity may be measured using a mooney viscometer. Particularly, the mooney viscosity may be measured by using MV-2000E of Monsanto Co. using Large Rotor at a rotor speed of 2±0.02 rpm at 100° C. In this case, a polymer was stood at room temperature (23±3° C.) for 30 minutes or more, and 27±3 g of the polymer was collected and put in a die cavity, and then, Platen was operated while applying torque for measurement.

In addition, the vinyl content in the modified conjugated diene-based polymer may be 5 wt % or more, 10 wt % or more, or 10 wt % to 60 wt %. Here, the vinyl content may mean the amount of not 1,4-added but 1,2-added conjugated diene-based monomer with respect to 100 wt % of a conjugated diene-based copolymer composed of a monomer having a vinyl group and an aromatic vinyl-based monomer.

Method for Preparing Modified Conjugated Diene-Based Polymer

In addition, the present invention provides a method for preparing a modified conjugated diene-based polymer.

The method for preparing a modified conjugated diene-based polymer according to an embodiment of the present invention is characterized in including polymerizing a conjugated diene-based monomer, or a conjugated diene-based monomer and an aromatic vinyl-based monomer in the presence of a polymerization initiator in a hydrocarbon solvent to prepare an active non-functional chain (S1); reacting the active non-functional chain with an alkoxysilane-based modifier to prepare a modified active non-functional chain (S2); and reacting the modified active non-functional chain and a functional chain including a repeating unit derived from an N-functional group-containing monomer (S3).

The hydrocarbon solvent is not specifically limited, but may be, for example, one or more selected from the group consisting of n-pentane, n-hexane, n-heptane, isooctane, cyclohexane, toluene, benzene and xylene.

The polymerization initiator is not specifically limited, but may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

According to an embodiment of the present invention, the polymerization initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. Here, 100 g of the monomer may represent the total amount of the conjugated diene-based monomer, or the conjugated diene-based monomer and the aromatic vinyl-based monomer.

S1 Step

The polymerization of step (S1) may be, for example, an anionic polymerization, and particularly, a living anionic polymerization by which an anionic active part is included at the polymerization terminal through a propagation polymerization reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding a polymerization initiator, and the polymerization with heating means a polymerization method including injecting the polymerization initiator and then, increasing the temperature by optionally applying heat. The isothermal polymerization means a polymerization method by which the temperature of a polymer is kept constant by increasing heat by applying heat or taking heat after adding the polymerization initiator.

In addition, according to an embodiment of the present invention, the polymerization of step (S1) may be performed by further adding a diene-based compound of 1 to 10 carbon atoms in addition to the conjugated diene-based monomer, and in this case, effects of preventing the formation of gel on the wall of a reactor during operation for a long time may be achieved. The diene-based compound may be, for example, 1,2-butadiene.

The polymerization of step (S1) may be performed in a temperature range of, for example, 80° C. or less, −20° C. to 80° C., 0° C. to 80° C., 0° C. to 70° C., or 10° C. to 70° C., and within the range, the molecular weight distribution of a polymer is controlled narrow, and the improving effects of physical properties were excellent.

The active main chain prepared by step (S1) may mean a polymer in which a polymer anion and an organometallic cation are coupled.

Meanwhile, the polymerization of step (S1) may be performed by including a polar additive, and the polar additive may be added in a ratio of 0.001 g to 50 g, 0.001 g to 10 g or 0.005 g to 0.1 g based on total 100 g of the monomer. In another embodiment, the polar additive may be added in a ratio of 0.001 g to 10 g, 0.005 g to 5 g, 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium mentholate and 2-ethyl tetrahydrofufuryl ether, preferably, 2,2-di(2-tetrahydrofuryl) propane, triethylamine, tetramethylethylenediamine, sodium mentholate or 2-ethyl tetrahydrofufuryl ether. If the polar additive is included, and if a conjugated diene-based monomer and an aromatic vinyl-based monomer are copolymerized, the difference of their reaction rates may be compensated, and effects of inducing easy formation of a random copolymer may be achieved.

S2 Step

The (S2) step is a step of reacting the active non-functional chain with an alkoxysilane-based compound to prepare a modified active non-functional chain, and here, the reaction may be modification or coupling reaction, and in this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator in step (S1).

S3 Step

In addition, the (S3) step is a step of reacting the modified active non-functional chain with a functional chain including the repeating unit derived from an N-functional group-containing monomer to prepare a modified conjugated diene-based polymer.

Meanwhile, the preparation method according to an embodiment of the present invention may further include a step of preparing a functional chain prior to the (S3) step, and the step of preparing the functional chain may be performed by performing polymerization reaction of an N-functional group-containing monomer, or an N-functional group-containing monomer and a conjugated diene-based monomer in the presence of an organolithium compound in a hydrocarbon solvent. In this case, the polymerization reaction may be a living anionic polymerization to give an anionic active part at the polymerization terminal by the propagation polymerization reaction by anions, and the functional chain may be a living anion terminal of which one terminal is capable of acting as a monomer.

Here, the organolithium compound may be an alkyl-lithium compound, and may particularly be methyllithium, ethyllithium, propyllithium, isopropyllithium, n-butyl-lithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, or 4-cyclopentyl lithium, more particularly, n-butyl-lithium.

In an embodiment, the functional chain may be prepared through Reaction 1 below and may be a compound having a structure represented by Formula M1 below.

[Reaction 1]

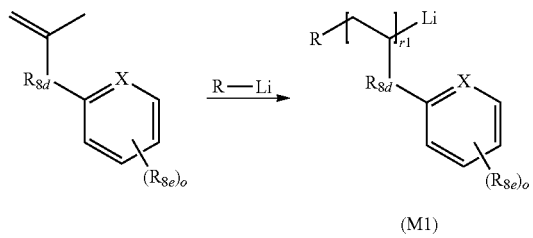

(M1)

In another embodiment, the functional chain may be prepared through Reaction 2 below and may be a compound having a structure represented by Formula M2 below.

[Reaction 2]

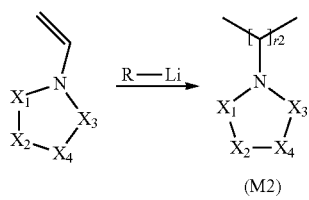

(M2)

In another embodiment, the functional chain may be prepared through Reaction 3 below and may be a compound having a structure represented by Formula M3 below.

[Reaction 3]

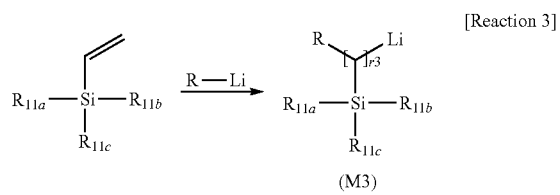

(M3)

In another embodiment, the functional chain may be prepared through Reaction 4 below and may be a compound having a structure represented by Formula M4 below.

[Reaction 4]

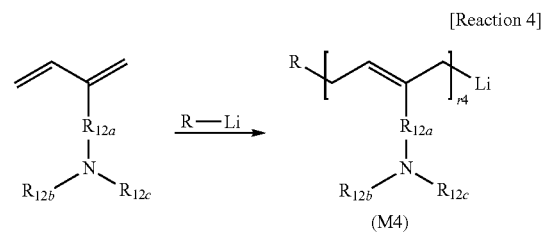

(M4)

In Reaction 1 to Reaction 4, $R_{8d}$, $R_8$, X, $X_1$-$X_2$, $X_3$-$X_4$, $R_{11a}$ to $R_{11c}$, $R_{12a}$ to $R_{12c}$, and o are the same as defined in Formula 1 to Formula 4, R—Li is an alkyllithium compound, and R is an alkyl group derived from the alkyl-lithium.

In addition, the functional chain may include 1 to 80, to 60, or 1 to 50 repeating units derived from the N-functional group-containing monomer selected from the compounds represented by Formula 1 to Formula 4, and for example, in Formula M1 to Formula M4, each of $r_1$ to $r_4$ may be 1 to 80, 1 to 60, or 1 to 50. In this case, the modified conjugated diene-based polymer including a sub chain derived from the functional chain may have the above-described Si and N contents and may have excellent processability, tensile properties and viscoelasticity properties in balance.

Meanwhile, the (S3) step may be for preparing a modified conjugated diene-based polymer by reacting the modified active polymer and the functional chain, i.e., the functional group derived from a modifier in the modified active polymer and the living anion terminal of the functional chain.

Particularly, the modified active polymer main chain prepared in the (S2) step includes the functional group derived from a modifier, and the functional group derived from a modifier includes an alkoxy group not reacted with a polymer chain but remaining, and accordingly, through the reaction of the living anion terminal of the functional chain and the alkoxy group, the modified conjugated diene-based polymer may be prepared.

In addition, the functional chain may use a polymerization initiator in 0.1 to 4.0 mol, 0.1 to 2.0 mol, or 0.5 to 1.5 mol based on 1 mol of the polymerization initiator.

In case of applying the preparation method according to an embodiment of the present invention, there are advantages of introducing more functional groups than a case of using only a modifier having a large number of functional groups. Particularly, to the active polymer and the alkoxy group of the modifier, it is difficult that two or more polymer chains may be bonded to one molecule of the modifier due to the steric hindrance of a polymer, and a modified polymer coupled with three or more chains may be possible but a small amount. However, as in the present invention, a functional chain having the weight average molecular weight by about 10% level of the non-functional chain may overcome steric hindrance effects, and accordingly, may be bonded to the alkoxy residual group of the modifier to which one or two non-functional chains are bonded, and more functional groups may be introduced to a polymer chain.

That is, the introduction of a functional group in one molecule of a modifier is definitely limited, and no matter how many functional groups are introduced, there must be an absolute amount difference when compared with a case of coupling the functional chain with an alkoxy residual group to a degree not affected by steric hindrance effects as in the present invention.

Accordingly, the modified conjugated diene-based polymer prepared by the preparation method of the modified conjugated diene-based polymer according to the present invention may have better tensile properties and viscoelasticity properties in contrast to the conventional single terminal-modified polymer. In addition, in view of a method utilizing an alkoxy residual group, non-functional properties may be maintained at the terminal for additional introduction of a functional group, and processability properties may be markedly improved in contrast to the conventional both terminal-modified polymer. In addition, the alkoxy residual group remaining in the derived unit from a modifier may be reduced when compared with the conventional preparation method, and side reactions such as condensation reaction and hydrolysis reaction performed due to the presence of a —OR group or a —OH group in a polymer may be markedly reduced, and accordingly, processability may be improved, a change with the passage of time may be markedly reduced, and storage stability may also be improved.

Rubber Composition

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber component, as necessary, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based polymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one among them or mixtures of two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, as necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or mixtures of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is introduced into an active part is used as a rubber component, the compounding amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of the rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio)methyl)-4-nonylphenol or 2-methyl-4,6-bis((octylthio)methyl)phenol, and may be used in an amount of 0.1 parts by weight to 6 parts by weight based on 100 parts by weight of the rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a compounding prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

EXAMPLES

Hereinafter, the present invention will be explained in more detail referring to embodiments. However, embodiments according to the present invention may be modified into various other types, and the scope of the present invention should not be limited to the embodiments described below. The embodiments of the present invention are provided for completely explaining the present invention to a person having an average knowledge in the art.

Experiment #1

Preparation Example 1

To a 500 ml, round-bottom flask, 100 ml of tetrahydrofuran and 1 g of n-butyllithium (10 wt % in n-hexane) were added, 1-vinyl-1H-imidazole (molar ratio of 3 mol in contrast to 1 mol of [act. Li]) was added, followed by reacting at 10° C. for 30 minutes to prepare a solution containing a functional chain (15.6 mmol/l). Through GC analysis, 1-vinyl-1H-imidazole was not detected after the reaction, and the achievement of the reaction was secured.

Example 1-1

To a 20 L, autoclave reactor, 3 kg of n-hexane, 215 g of styrene, 745 g of 1,3-butadiene and 1.29 g of 2,2-bis(2-oxoranyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, 1,1,1-trimethyl-N-(3-(triethoxysilyl)propyl)-N-(trimethylsilyl)silanamine was injected as a modifier and reacted for 15 minutes (molar ratio of [DTP]:[act. Li]=1.5:1, molar ratio of [modifier]:[act. Li]=0.7:1). Then, the solution containing a functional chain prepared in Preparation Example 1 was added and reacted for 15 minutes (molar ratio of [act. Li]:[functional chain]=1:1), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Example 1-2

A modified styrene-butadiene copolymer was prepared by performing the same method in Example 1-1 except for using 3-(2,2-dimethoxy-1,2-azasilolidin-1-yl)-N,N-bis(3-(trimethoxysilyl)propyl)propan-1-amine instead of 1,1,1-trimethyl-N-(3-triethoxysilyl)propyl)-N-(trimethylsilyl)silaneamine as a modifier (molar ratio of [modifier]:[act. Li]=0.7:1).

Comparative Example 1-1

A modified styrene-butadiene copolymer was prepared by performing the same method in Example 1-1 except for injecting the solution containing a functional chain prepared in Preparation Example 1 instead of the n-butyllithium in Example 1-1 such that the mol of the functional chain was the same as the n-butyllithium in Example 1-1, performing the adiabatic reaction with heating, not performing a step of adding a modifier and a functional chain and reacting, and quenching the reaction after butadiene capping.

Comparative Example 1-2

To a 20 L, autoclave reactor, 3 kg of n-hexane, 215 g of styrene, 745 g of 1,3-butadiene and 1.29 g of 2,2-bis(2-oxoranyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, 1,1,1-trimethyl-N-(3-(triethoxysilyl)propyl)-N-(trimethylsilyl)silanamine was injected as a modifier and reacted for 15 minutes (molar ratio of [DTP]:[act.

Li]=1.5:1, molar ratio of [modifier]:[act. Li]=0.7:1). Then, the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Comparative Example 1-3

A modified styrene-butadiene copolymer was prepared by performing the same method in Comparative Example 1-2 except for injecting the solution containing a functional chain prepared in Preparation Example 1 instead of the n-butyllithium in Comparative Example 1-2 such that the mol of the functional chain was the same as the n-butyllithium in Comparative Example 1-2, and performing the adiabatic reaction with heating in Comparative Example 1-2 (molar ratio of [DTP]:[act Li]=1.5:1, molar ratio of [modifier]:[act. Li]=0.7:1).

Evaluation of Properties of Polymer

With respect to each of the modified or unmodified conjugated diene-based polymers prepared in the Examples and Comparative Examples, the styrene unit and vinyl contents in each polymer, a weight average molecular weight (Mw, ×10³ g/mol), a number average molecular weight (Mn, ×10³ g/mol), molecular weight distribution (PDI, MWD), mooney viscosity (MV), the rate of change of mooney viscosity, and the Si and N contents were measured, respectively. The results are shown in Table 1 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw, ×10³ g/Mol), Number Average Molecular Weight (Mn, ×10³ g/Mol), and Molecular Weight Distribution (PDI, MWD)

By gel permeation chromatography (GPC) analysis, a weight average molecular weight (Mw) and a number average molecular weight (Mn) were measured and a molecular weight distribution curve was obtained. In addition, molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound.

3) Mooney Viscosity

The mooney viscosity (MV, (ML1+4, @100° C.) MU) was measured by using MV-2000 (ALPHA Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

4) Si Content

The Si content was measured by an ICP analysis method, which used an inductively coupled plasma optical emission spectroscopy (ICP-OES; Optima 7300DV). Particularly, measurement was performed by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:
  1) step 1: initial temp 0° C., rate (temp/hr) 180° C./hr, temp (holdtime) 180° C. (1 hr)
  2) step 2: initial temp 180° C., rate (temp/hr) 85° C./hr, temp (holdtime) 370° C. (2 hr)
  3) step 3: initial temp 370° C., rate (temp/hr) 47° C./hr, temp (holdtime) 510° C. (3 hr),
  adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

5) N Content

The N content was measured through an NSX analysis method using a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

TABLE 1

| Division | | Example 1-1 | Example 1-2 | Comparative Example 1-1 | Comparative Example 1-2 | Comparative Example 1-3 |
|---|---|---|---|---|---|---|
| NMR (wt %) | SM | 21 | 21 | 21 | 21 | 21 |
| | Vinyl | 50 | 50 | 50 | 50 | 50 |
| GPC | Mn (x10³ g/mol) | 352 | 421 | 350 | 434 | 338 |
| | Mw (x10³ g/mol) | 503 | 665 | 385 | 350 | 497 |
| | PDI | 1.43 | 1.58 | 1.10 | 1.24 | 1.47 |
| Mooney viscosity (MV) | | 73 | 86 | 46 | 67 | 72 |
| Si content (ppm) | | 228 | 234 | — | 301 | 228 |
| N content ppm) | | 362 | 411 | 240 | 62 | 358 |
| N-functional group-containing monomer | Unit number | 3 | 3 | 3 | — | 3 |
| | Position | Modifier side terminal | Modifier side terminal | Initial terminal | — | Initial terminal |

As shown in Table 1 above, in Examples 1-1 and 1-2, Si and N atoms were present in a polymer molecule, and the N content was largely increased in contrast to Comparative Example 1-1. In this case, Comparative Example 1-1 was a polymer prepared without using a modifier, and the non-existence of Si atoms was found. In case of Comparative Example 1-2, due to the non-existence of a functional chain, the markedly small N content was measured.

Evaluation of Properties of Rubber Molded Article

In order to compare and analyze the physical properties of rubber compositions including the modified styrene-butadiene copolymers prepared in the Examples and Comparative Examples, and molded articles manufactured therefrom, tensile properties and viscoelasticity properties were measured, respectively, and the results are shown in Table 3 below.

1) Preparation of Rubber Specimen

Blending was performed using each of the modified or unmodified conjugated diene-based polymers of the Examples, Comparative Examples and Reference Examples as a raw material rubber under the compounding conditions shown in Table 2 below. The raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystalline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator (diphenylguanidine (DPG)), and a vulcanization accelerator (N-cyclohexyl-2-benzothiazylsulfenamide (CZ)) were added to the mulling apparatus and mixed at a temperature of 100° C. or less to obtain a second compound mixture. Then, via a curing process at 160° C. for 20 minutes, a rubber specimen was formed.

2) Tensile Properties

For measuring the tensile properties, each test specimen was manufactured and tensile stress when stretched by 300% (300% modulus) of each specimen was measured according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value. From the resultant values, if a tan δ value at a low temperature of 0° C. increases, wet skid resistance becomes better, and if a tan δ at a high temperature of 60° C. decreases, hysteresis loss decreases, and low running resistance (fuel consumption ratio) becomes better. The resultant values in Table 3 were indexed (%) by setting the resultant values of Comparative Example 1-1 to 100, and thus, the higher numerical value means better results.

4) Processability Properties

By measuring the mooney viscosity (MV, (ML1+4, @100° C.) MU) of the second compound mixture obtained during 1) preparation of rubber specimen, the processability properties of each polymer was compared and analyzed, and in this case, the lower the measured value of the moony viscosity is, the better the processability properties are. The resultant values in Table 3 were indexed (%) by setting the resultant values of Comparative Example 1-1 to 100, and thus, the higher numerical value means better results.

Particularly, by using MV-2000 (ALPHA Technologies Co.) using Large Rotor at a rotor speed of 2±0.02 rpm at 100° C., each secondary compound mixture was stood at room temperature (23±3° C.) for 30 minutes or more, and 27±3 g was collected and put in a die cavity, and then, Platen was operated for 4 minutes for measurement.

TABLE 3

| | | Example | | Comparative Example | | |
|---|---|---|---|---|---|---|
| Division | | 1-1 | 1-2 | 1-1 | 1-2 | 1-3 |
| 300% modulus (kgf/cm$^2$) | | 157 | 161 | 147 | 150 | 159 |
| Viscoelasticity properties | Tan δ (at 0° C., Index) | 100 | 100 | 100 | 99 | 101 |
| | Tan δ (at 60° C., Index) | 121 | 124 | 100 | 105 | 120 |
| Processability properties (Index) | | 102 | 101 | 100 | 102 | 72 |

* All indexes are values based on Comparative Example 1-1.

As shown in Table 3, it was confirmed that Examples 1-1 and 1-2, which used the modified conjugated diene-based polymers according to embodiments of the present invention, showed excellent processability properties and at the same time, excellent tensile properties and viscoelasticity properties when compared with Comparative Examples 1-1 to 1-3.

It could be confirmed that Examples 1-1 and 1-2 showed very marked difference in rotation resistance and improved results of tensile properties when compared with Comparative Examples 1-1 and 1-2, and showed equal or better tensile properties, improved viscoelasticity properties and markedly improved processability properties when compared with Comparative Example 1-3. It could be found that these effects were achieved in the Examples due to the use of the functional chain together with a modification initiator and not using a modifier coupled with a functional group, and markedly significantly different processability was shown.

Through this, it was confirmed that marked effects not shown in Comparative Example 1-3 were shown in the modified conjugated diene-based polymer of the present invention by being prepared by a preparation method including a step of reacting a functional chain after modification reaction. Through the effect difference, it could be anticipated that the modified conjugated diene-based polymer of the present invention is a copolymer having a different structure from Comparative Example 1-3, for example, a structure similar to a graft copolymer through the coupling of the functional chain including the repeating unit derived from the N-functional group-containing monomer derived from the functional chain with the non-functional chain of the modified polymer via the functional group derived from a modifier.

Experiment #2

Preparation Example 2

To a 500 ml, round-bottom flask, 100 ml of tetrahydrofuran and 1 g of n-butyllithium (10 wt % in n-hexane) were added, N,N'-diethyl-N,N'-diisopropyl-1,1-divinylsilanediamine (molar ratio of 3 mol in contrast to 1 mol of [act. Li]) was added, followed by reacting at 10° C. for minutes to prepare a solution containing a functional chain (15.6 mmol/l). Through GC analysis, N,N'-diethyl-N,N'-diisopropyl-1,1-divinylsilanediamine was not detected after the reaction, and the achievement of the reaction was secured.

Example 2-1

To a 20 L, autoclave reactor, 3 kg of n-hexane, 215 g of styrene, 745 g of 1,3-butadiene and 1.29 g of 2,2-bis(2-oxoranyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, N,N-diethyl-3-(trimethoxysilyl)propan-1-amine was injected as a modifier and reacted for 15 minutes (molar ratio of [DTP]:[act. Li]=1.5:1, molar ratio of [modifier]:[act. Li]=0.7:1). Then, the solution containing a functional chain prepared in Preparation Example 2 was added and reacted for 15 minutes (molar ratio of [functional chain]:[act. Li]=1:1), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Example 2-2

A modified styrene-butadiene copolymer was prepared by performing the same method in Example 2-1 except for using N,N-bis(oxiran-2-ylmethyl)-3-(trimethoxysilyl)propan-1-amine instead of N,N-diethyl-3-(trimethoxysilyl)propan-1-amine as a modifier (molar ratio of [modifier]:[act. Li]=0.7:1).

Comparative Example 2-1

A modified styrene-butadiene copolymer was prepared by performing the same method in Example 2-1 except for injecting the solution containing a functional chain prepared in Preparation Example 2 instead of the n-butyllithium in Example 2-1 such that the mol of the functional chain was the same as the n-butyllithium in Example 2-1, performing the adiabatic reaction with heating, not performing a step of adding a modifier and a functional chain and reacting, and quenching the reaction after butadiene capping.

Comparative Example 2-2

To a 20 L, autoclave reactor, 3 kg of n-hexane, 215 g of styrene, 745 g of 1,3-butadiene and 1.29 g of 2,2-bis(2-oxoranyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, N,N-diethyl-3-(trimethoxysilyl)propan-1-amine was injected as a modifier and reacted for 15 minutes (molar ratio of [DTP]:[act. Li]=1.5:1, molar ratio of [modifier]:[act. Li]=0.7:1). Then, the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Comparative Example 2-3

A modified styrene-butadiene copolymer was prepared by performing the same method in Comparative Example 2-2 except for using 3,3'-(1,1,3,3-tetramethoxydisiloxane-1,3-diyl)bis(N,N-diethylpropan-1-amine) instead of N,N-diethyl-3-(trimethoxysilyl)propan-1-amine as a modifier (molar ratio of [modifier]:[act. Li]=0.7:1).

Comparative Example 2-4

A modified styrene-butadiene copolymer was prepared by performing the same method in Comparative Example 2-2 except for injecting the solution containing a functional chain prepared in Preparation Example 2 instead of the n-butyllithium in Comparative Example 2-2 such that the mol of the functional chain was the same as the n-butyllithium in Comparative Example 2-2, and performing the adiabatic reaction with heating.

Comparative Example 2-5

A modified styrene-butadiene copolymer was prepared by performing the same method in Comparative Example 2-4 except for injecting 3,3'-(1,1,3,3-tetramethoxydisiloxane-1,3-diyl)bis(N,N-diethylpropan-1-amine) instead of N,N-diethyl-3-(trimethoxysilyl)propan-1-amine as a modifier (molar ratio of [modifier]:[act. Li]=0.7:1).

Evaluation of Properties of Polymer

With respect to each of the modified or unmodified conjugated diene-based polymers prepared in the Examples and Comparative Examples, the styrene unit and vinyl contents in each polymer, a weight average molecular weight (Mw, ×10³ g/mol), a number average molecular weight (Mn, ×10³ g/mol), molecular weight distribution (PDI, MWD), mooney viscosity (MV), the rate of change of mooney viscosity, and the Si and N contents were measured, respectively, by the same methods in Experiment #1. The results are shown in Table 4 below.

TABLE 4

| Division | | Example | | Comparative Example | | | | |
|---|---|---|---|---|---|---|---|---|
| | | 2-1 | 2-2 | 2-1 | 2-2 | 2-3 | 2-4 | 2-5 |
| NMR (wt %) | SM | 20.8 | 21.2 | 20.3 | 21.4 | 20.7 | 20.6 | 21.2 |
| | Vinyl | 48.9 | 50.4 | 50.2 | 50.8 | 50.1 | 49.5 | 49.0 |
| GPC | Mn (x$10^3$ g/mol) | 392 | 403 | 394 | 405 | 380 | 402 | 380 |
| | Mw (x$10^3$ g/mol) | 514 | 516 | 453 | 514 | 467 | 522 | 505 |
| | PDI | 1.31 | 1.28 | 1.15 | 1.27 | 1.23 | 1.30 | 1.33 |
| Mooney viscosity (MV) | | 62 | 62 | 51 | 62 | 53 | 63 | 60 |
| Si content (ppm) | | 424 | 413 | 225 | 78 | 155 | 414 | 489 |
| N content (ppm) | | 383 | 372 | 224 | 39 | 77 | 374 | 409 |
| N-functional group-containing monomer | Unit number | 3 | 3 | 3 | — | — | 3 | 3 |
| | Position | Modifier side terminal | Modifier side terminal | Initial terminal | — | — | Initial terminal | Initial terminal |

As shown in Table 4 above, in Examples 2-1 and 2-2, Si and N atoms were present in a polymer molecule, and the N content was largely increased in contrast to Comparative Examples 2-1 to 2-3.

Evaluation of Properties of Rubber Molded Article

In order to compare and analyze the physical properties of rubber compositions including the modified styrene-butadiene copolymers prepared in the Examples and Comparative Examples, and molded articles manufactured therefrom, tensile properties and viscoelasticity properties were measured, respectively, as in Experiment #1, and the results are shown in Table 5 below. The specimen of the molded article was also manufactured by the same method in Experiment #1.

TABLE 5

| Division | | Example | | Comparative Example | | | | |
|---|---|---|---|---|---|---|---|---|
| | | 2-1 | 2-2 | 2-1 | 2-2 | 2-3 | 2-4 | 2-5 |
| 300% modulus (kgf/cm$^2$) | | 161 | 164 | 148 | 149 | 147 | 161 | 163 |
| Viscoelasticity properties | Tan δ (at 0° C., Index) | 102 | 99 | 100 | 97 | 100 | 99 | 101 |
| | Tan δ (at 60° C., Index) | 116 | 114 | 100 | 98 | 99 | 114 | 115 |
| Processability properties (Index) | | 100 | 102 | 95 | 100 | 98 | 75 | 74 |

* All indexes are values based on Comparative Example 2-2.

As shown in Table 5, it was confirmed that Examples 2-1 and 2-2, which used the modified conjugated diene-based polymers according to embodiments of the present invention, showed excellent processability properties and at the same time, excellent tensile properties and viscoelasticity properties when compared with Comparative Examples 2-1 to 2-5.

It could be confirmed that Examples 2-1 and 2-2 showed very marked difference in rotation resistance and improved results of tensile properties when compared with Comparative Examples 2-1 to 2-3, and showed equal or better tensile properties, improved viscoelasticity properties and markedly improved processability properties when compared with Comparative Examples 2-4 and 2-5. It could be found that these effects were achieved in the Examples due to the use of the functional chain together with a modification initiator and not using a modifier coupled with a functional group, and markedly significantly different processability was shown.

Through this, it was confirmed that marked effects not shown in Comparative Examples 2-4 and 2-5 were shown in the modified conjugated diene-based polymer of the present invention by being prepared by a preparation method including a step of reacting with a functional chain after modification reaction. Through the effect difference, it could be anticipated that the modified conjugated diene-based polymer of the present invention is a copolymer having a different structure from the Comparative Examples, for example, a structure similar to a graft copolymer through the coupling of the functional chain including the repeating unit derived from the N-functional group-containing monomer derived from the functional chain with the non-functional chain of the modified polymer via the functional group derived from a modifier.

Experiment #3

Preparation Example 3

To a 500 ml, round-bottom flask, 100 ml of tetrahydrofuran and 1 g of n-butyllithium (10 wt % in n-hexane) were added, N,N-dimethyl-4-methylenehexene-5-en-1-amine (molar ratio of 3 mol in contrast to 1 mol of [act. Li]) was added, followed by reacting at 10° C. for 30 minutes to prepare a solution containing a functional chain (15.6 mmol/l). Through GC analysis, N,N-dimethyl-4-methylenehex-5-en-1-amine was not detected after the reaction, and the achievement of the reaction was secured.

Example 3-1

To a 20 L, autoclave reactor, 3 kg of n-hexane, 215 g of styrene, 745 g of 1,3-butadiene and 1.29 g of 2,2-bis(2-oxoranyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, 3,3'-(piperazine-1,4-diyl)bis(N,N-bis(3-(triethoxysilyl)propyl)propan-1-amine) was injected as a modifier and reacted for 15 minutes (molar ratio of [DTP]:[act. Li]=1.5:1, molar ratio of [modifier]:[act. Li]=0.7:1). Then, the solution containing a functional chain prepared in Preparation Example 3 was added and reacted for 15 minutes (molar ratio of [act. Li]:[functional chain]=1:2), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Example 3-2

A modified styrene-butadiene copolymer was prepared by performing the same method in Example 3-1 except for using N,N'-(cyclohexane-1,3-diylbis(methylene))bis(3-(trimethoxysilyl)-N-(3-(trimethoxysilyl)propyl)propan-1-amine) instead of 3,3'-(piperazine-1,4-diyl)bis(N,N-bis(3-(triethoxysilyl)propyl)propan-1-amine) as a modifier (molar ratio of [modifier]:[act. Li]=0.7:1).

Comparative Example 3-1

A modified styrene-butadiene copolymer was prepared by performing the same method in Example 3-1 except for injecting the solution containing a functional chain prepared in Preparation Example 3 instead of the n-butyllithium in Example 3-1 such that the mol of the functional chain was the same as the n-butyllithium in Example 3-1, performing the adiabatic reaction with heating, not performing a step of adding a modifier and a functional chain and reacting, and quenching the reaction after butadiene capping.

Comparative Example 3-2

To a 20 L, autoclave reactor, 3 kg of n-hexane, 215 g of styrene, 745 g of 1,3-butadiene and 1.29 g of 2,2-bis(2-oxoranyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, 3,3'-(piperazine-1,4-diyl)bis(N,N-bis(3-(triethoxysilyl)propyl)propan-1-amine was injected as a modifier and reacted for 15 minutes (molar ratio of [DTP]:[act. Li]=1.5:1, molar ratio of [modifier]:[act. Li]=0.7:1). Then, the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Comparative Example 3-3

A modified styrene-butadiene copolymer was prepared by performing the same method in Comparative Example 3-2 except for injecting the solution containing a functional chain prepared in Preparation Example 3 instead of the n-butyllithium in Comparative Example 3-2 such that the mol of the functional chain was the same as the n-butyllithium in Comparative Example 3-2, and performing the adiabatic reaction with heating.

Evaluation of Properties of Polymer

With respect to each of the modified or unmodified conjugated diene-based polymers prepared in the Examples and Comparative Examples, the styrene unit and vinyl contents in each polymer, a weight average molecular weight (Mw, ×10³ g/mol), a number average molecular weight (Mn, ×10³ g/mol), molecular weight distribution (PDI, MWD), mooney viscosity (MV), the rate of change of mooney viscosity, and the Si and N contents were measured, respectively, by the same methods in Experiment #1. The results are shown in Table 6 below.

TABLE 6

| Division | | Example | | Comparative Example | | |
|---|---|---|---|---|---|---|
| | | 3-1 | 3-2 | 3-1 | 3-2 | 3-3 |
| NMR (wt %) | SM | 20.8 | 21.3 | 20.7 | 21.4 | 20.7 |
| | Vinyl | 50.3 | 50.1 | 49.6 | 50.2 | 50.0 |
| GPC | Mn (×10³ g/mol) | 450 | 475 | 389 | 459 | 459 |
| | Mw (×10³ g/mol) | 792 | 869 | 459 | 798 | 818 |
| | PDI | 1.76 | 1.83 | 1.18 | 1.73 | 1.78 |
| Mooney viscosity (MV) | | 114 | 129 | 51 | 114 | 119 |
| Si content (ppm) | | 315 | 315 | — | 312 | 319 |
| N content (ppm) | | 325 | 246 | 112 | 156 | 272 |
| N-functional group-containing monomer | Unit number | 3 | 3 | 3 | — | 3 |
| | Position | Modifier side terminal | Modifier side terminal | Initial terminal | — | Initial terminal |

As shown in Table 6 above, in Examples 3-1 and 3-2, Si and N atoms were present in a polymer molecule, and the N content was largely increased in contrast to Comparative Examples 3-1 and 3-2.

Evaluation of Properties of Rubber Molded Article

In order to compare and analyze the physical properties of rubber compositions including the modified styrene-butadiene copolymers prepared in the Examples and Comparative Examples, and molded articles manufactured therefrom, tensile properties and viscoelasticity properties were measured, respectively, as in Experiment #1, and the results are shown in Table 7 below. The specimen of the molded article was also manufactured by the same method in Experiment #1.

TABLE 7

| Division | | Example | | Comparative Example | | |
|---|---|---|---|---|---|---|
| | | 3-1 | 3-2 | 3-1 | 3-2 | 3-3 |
| 300% modulus (kgf/cm²) | | 162 | 161 | 145 | 149 | 164 |
| Viscoelasticity properties | Tan δ (at 0° C., Index) | 101 | 102 | 100 | 101 | 96 |
| | Tan δ (at 60° C., Index) | 125 | 121 | 100 | 106 | 119 |
| Processability properties (Index) | | 98 | 99 | 100 | 102 | 73 |

* All indexes are values based on Comparative Example 3-1.

As shown in Table 7, it was confirmed that Examples 3-1 and 3-2, which used the modified conjugated diene-based polymers according to embodiments of the present invention, showed excellent processability properties and at the same time, excellent tensile properties and viscoelasticity properties when compared with Comparative Examples 3-1 and 3-2.

It could be confirmed that Examples 3-1 and 3-2 showed very marked difference in rotation resistance and improved results of tensile properties when compared with Comparative Examples 3-1 and 3-2, and showed equal or better tensile properties, improved viscoelasticity properties and markedly improved processability properties when compared with Comparative Example 3-3. It could be found that these effects were achieved in the Examples due to the use of the functional chain together with a modification initiator and not using a modifier coupled with a functional group, and markedly significantly different processability was shown.

Through this, it was confirmed that marked effects not shown in Comparative Example 3-3 were shown in the modified conjugated diene-based polymer of the present invention by being prepared by a preparation method including a step of reacting with a functional chain after modification reaction. Through the effect difference, it could be anticipated that the modified conjugated diene-based polymer of the present invention is a copolymer having a different structure from Comparative Example 3-3, for example, a structure similar to a graft copolymer through the coupling of the functional chain including the repeating unit derived from the N-functional group-containing monomer derived from the functional chain with the non-functional chain of the modified polymer via the functional group derived from a modifier.

The invention claimed is:

1. A modified conjugated diene-based polymer, comprising:
   a derived unit from a modifier, wherein the modifier comprising three or more alkoxy groups bonded to silicon;
   a non-functional chain forming a silicon-carbon bond at one side of the derived unit from a modifier, wherein the non-functional chain comprising a repeating unit derived from a conjugated diene-based monomer;
   a functional chain forming a silicon-carbon bond at the other side of the derived unit from a modifier, wherein the functional chain comprising two or more derived units from an N-functional group-containing monomer; and
   wherein the non-functional chain further comprises a repeating unit derived from an aromatic vinyl-based monomer,
   wherein the modified conjugated diene-based polymer has a nitrogen (N) content, based on weight, of 150 ppm or more,
   wherein the N-functional group containing monomer is selected from:

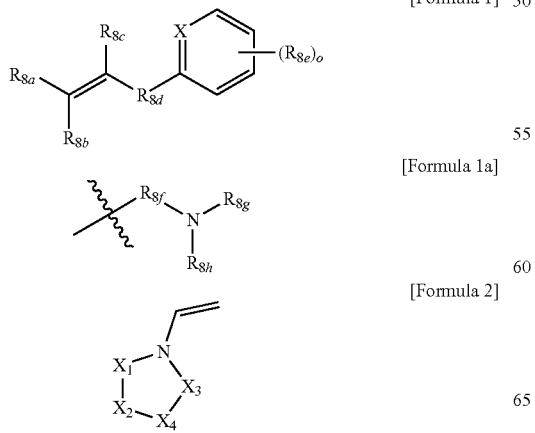

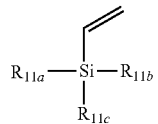

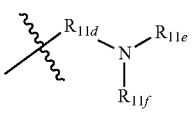

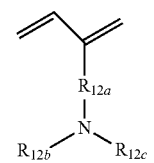

wherein, X is N or CH, R8a to R8c are each independently a hydrogen atom; an alkyl group of 1 to 20 carbon atoms; an alkenyl group of 2 to 20 carbon atoms; an alkynyl group of 2 to 20 carbon atoms; a heteroalkyl group of 1 to 20 carbon atoms, a heteroalkenyl group of 2 to 20 carbon atoms; a heteroalkynyl group of 2 to 15 20 carbon atoms; a cycloalkyl group of 5 to 20 carbon atoms; an aryl group of 6 to 20 carbon atoms; or a heterocyclic group of 3 to 20 carbon atoms, R8d is a single bond, a substituted with a substituent or unsubstituted alkylene group of 1 to 20 carbon 20 atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, R8e is an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl 10 group of 5 to 20 carbon atoms; an aryl group of 6 to 20 carbon atoms; a heterocyclic group of 3 to 20 carbon atoms; or a functional group represented by Formula 1a, and O is an integer of 0 to 5, at least one R8e is a functional group represented by Formula 1a, and if o is 15 an integer of 2 to 5, multiple R8e groups may be the same or different, in Formula 1a, R8f is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and R8g and R8h are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms or a mono-substituted, di-substituted or trisubstituted alkylsilyl group with alkyl groups of 1 to 10 carbon atoms, or R8g and R8h are connected with each other to form a heterocyclic group of 2 to 10 carbon atoms together with N; in Formula 2, X1-X2 is CH2-CH2 or CH=CH, and X3-X4 is CH2-CH2, CH=N or N=N; in Formula 3, R11a and R11b are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 10 20 carbon atoms; a cycloalkyl group of 5 to 20 carbon atoms; an aryl group of 6 to 20 carbon atoms; a heterocyclic group of 3 to 20 carbon atoms; or a functional group represented by Formula 3a below, R11c is an alkyl group of 1 to 20 carbon atoms; an alkenyl group of 2 to 20 carbon atoms; an alkynyl group of 2 to 20 carbon atoms; a heteroalkyl group of 1 to 20 carbon atoms, a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a functional group represented by Formula 3a and at least one of R11a, R11b and R11c is a functional group represented by Formula 3a below; in Formula 3a, R11d is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and R11e and R11f are each independently an alkyl group of 1 to 20 carbon atoms; an alkenyl group of 2 to 20 carbon 15 atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group 20 of 3 to 20 carbon atoms; or a mono-substituted, disubstituted or tri-substituted alkylsilyl group with alkyl groups of 1 to 10 carbon atoms; in Formula 4, R12a is a single bond or a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of to 10 carbon atoms, or an aryl group of 6 to 20 carbon atoms, and R12b and R12c are each independently an alkyl group of 1 to 20 carbon atoms; an alkenyl group of 2 to 20 carbon 15 atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, disubstituted or tri-substituted alkylsilyl group with alkyl groups of 1 to 10 carbon atoms.

2. The modified conjugated diene-based polymer according to claim 1, wherein one or more of the functional chain are bonded to the derived unit from a modifier.

3. The modified conjugated diene-based polymer according to claim 1, wherein the functional chain further comprises a derived unit from a conjugated diene-based monomer.

4. The modified conjugated diene-based polymer according to claim 1, wherein the functional chain comprises 2 to 80 units of the derived unit from an N-functional group-containing monomer.

5. The modified conjugated diene-based polymer according to claim 1, wherein the modifier is an amine-containing alkoxysilane-based compound or a non-amine-containing alkoxysilane-based compound, and the modifier comprises three or more alkoxysilane groups.

6. The modified conjugated diene-based polymer according to claim 1, wherein the modified conjugated diene-based polymer has a number average molecular weight (Mn) of 1,000 g/mol to 2,000,000 g/mol, a weight average molecular weight (Mw) of 1,000 g/mol to 3,000,000 g/mol, and a peak average molecular weight (Mp) of 1,000 g/mol to 3,000,000 g/mol.

7. A rubber composition comprising the modified conjugated diene-based polymer of claim 1, and a filler.

8. The rubber composition according to claim 7, wherein the rubber composition comprises 0.1 parts by weight to 200 parts by weight of the filler based on 100 parts by weight of the modified conjugated diene-based polymer.

* * * * *